US011592857B2

(12) United States Patent
Shen et al.

(10) Patent No.: US 11,592,857 B2
(45) Date of Patent: Feb. 28, 2023

(54) BANDGAP-LESS REFERENCE GENERATOR

(71) Applicant: Intel Corporation, Santa Clara, CA (US)

(72) Inventors: Kuan-Yueh Shen, Portland, OR (US); Jae Limb, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 16/799,487

(22) Filed: Feb. 24, 2020

(65) Prior Publication Data

US 2021/0263547 A1 Aug. 26, 2021

(51) Int. Cl.
*G05F 3/26* (2006.01)
*G06F 1/26* (2006.01)
*G01K 13/00* (2021.01)

(52) U.S. Cl.
CPC ............. *G05F 3/262* (2013.01); *G06F 1/26* (2013.01); *G01K 13/00* (2013.01); *G01K 2217/00* (2013.01)

(58) Field of Classification Search
CPC ........... G05F 3/262; G06F 1/26; G01K 13/00; G01K 2217/00
See application file for complete search history.

(56) References Cited

U.S. PATENT DOCUMENTS

2020/0011742 A1* 1/2020 Ma ............................ G05F 3/24
2020/0218304 A1* 7/2020 Raghavan ............... G05F 3/245
2020/0401177 A1* 12/2020 Liang ...................... G05F 1/595

OTHER PUBLICATIONS

Banba, Hironori et al., "A CMOS Bandgap Reference Circuit with Sub-1-V Operation", IEEE Journal of Solid-State Circuits, vol. 34, No. 5, May 1999, 5 pgs.
Razavi, Behzad, "Design of Analog CMOS Integrated Circuits", Chapter 11, McGraw-Hill, 2002, 28 pgs.

* cited by examiner

*Primary Examiner* — Jeffrey M Shin
(74) *Attorney, Agent, or Firm* — Schwabe, Williamson & Wyatt, P.C.

(57) ABSTRACT

The bandgap-less apparatus is a fast settling circuit (e.g., with settling time of less than 40 ns) that can leverage proportional-to-absolute-temperature only (PTAT-only) currents to generate a zero or substantially zero temperature coefficient, or even complementary-to-absolute-temperature (CTAT), reference current or voltage, without the need of a native CTAT component or bandgap diodes. The apparatus subtracts two different PTAT currents so that the resulting current is zero-TC. The resulting current is a reference current. The resulting current can be converted to a reference voltage.

20 Claims, 12 Drawing Sheets

US 11,592,857 B2

BANDGAP-LESS REFERENCE GENERATOR

BACKGROUND

Integrated bandgap reference (BGREF) circuits are used to generate a supply and temperature independent reference voltage, but not a reference current. Based on parasitic bi-polar junction transistor (BJT) in complementary metal oxide semiconductor (CMOS) technology, the BGREF (or sub-bandgap reference) outputs near zero temperature coefficient (TC) voltage by canceling a complementary-to-absolute-temperature (CTAT) voltage and a proportional-to-absolute-temperature (PTAT) voltage in a feedback loop. The emitter-to-base voltage $V_{EB}$ of a PNP parasitic BJT in a diode-connected configuration, or BGdiode (bandgap diodes), is CTAT and typically gives negative TC of −2 mV/° C. A delta $V_{EB}$ between two BGdiodes with area ratio of N:1 but identical emitter currents is PTAT and has a positive TC linearly proportional to the thermal voltage times ln(N). BGREF calibration may be done at done at two temperatures (e.g., cold and hot) and on per part basis.

Parasitic BJT's ideality factor and its variation continue to degrade as CMOS technology scales, resulting in BGREF output voltage distributions being too wide. Enabling high quality BJTs become even more challenging as transistor architecture moves to gate all-around. Further, BGREF circuits are usually slow to settle (e.g., approximately 1-4 p,$), large in area (e.g., approximately 70×90 µm$^2$ in a sub 10 nm CMOS process), and consume relatively high current (e.g., approximately 700 µA in a sub 10 nm CMOS process).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
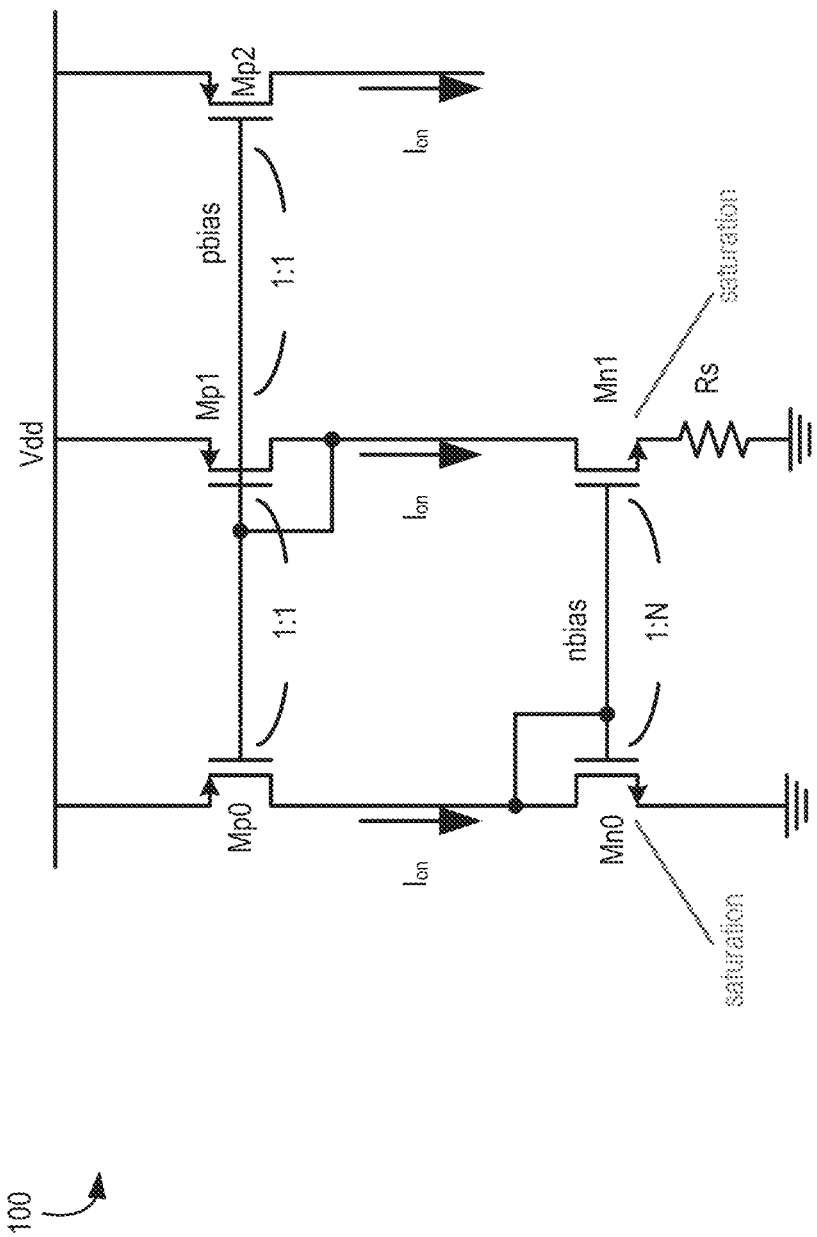
FIG. 1 illustrates a schematic of an apparatus that produces a reference PTAT current, in accordance with some embodiments.

Some embodiments provide bandgap-less apparatus with a fast settling circuit (e.g., with settling time of less than 40 ns) that can leverage PTAT-only currents to generate a zero-TC, or even CTAT, reference current or voltage, without the need of a native CTAT component or bandgap diodes (BGdiodes). In some embodiments, the bandgap-less apparatus uses trimming at two temperatures per process window because BGdiode has a process skew window where TC varies differently from that of transistors. Measuring at two temperature points per instance ensures the TC or the temperature "slope" is determined, rather than measuring at one temperature point and applying a deduced single slope. The bandgap-less apparatus offers a PVT (process, voltage, and temperature) insensitive reference. In some embodiments, PVT insensitive reference generated by the bandgap-less apparatus is used in a voltage regulator as a reference voltage. Any other circuit may also use the current reference or voltage reference generated by the apparatus described herein.

The bandgap-less apparatus of some embodiments subtracts two different PTAT currents so that the resulting current has zero or substantially zero temperature coefficient (zero-TC). The two different PTAT currents can have different temperature coefficients (TCs). For example, the TCs can be negative, positive, or same polarity but with different slopes. The reason to have different TCs is as follows. For instance, both PTAT currents increase 20%, from cold to hot, for example, the first from 50 µA to 60 µA and the second from 10 µA to 12 µA, then their difference follows the same TC, growing from 40 µA to 48 µA. If the 2$^{nd}$ current has a higher positive TC and increases from 10 µA at cold to 20 µA at hot, then the difference is a constant of 40 µA. In various embodiments, a near zero-TC current or voltage is generated by subtracting two same-sign but different-magnitude TC quantities.

There are many technical effects of various embodiments. For example, the bandgap-less apparatus of various embodiments addresses a localized reference current generation for, say, a current starved ring oscillator, a bias current for an LC (inductor-capacitor) tank, or a charge pump, where its TC can be tailored through the PTAT design elements. The bandgap-less apparatus uses no operational amplifiers (OpAmp) Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

Here, the term "analog signal" is any continuous signal for which the time varying feature (variable) of the signal is a representation of some other time varying quantity, i.e., analogous to another time varying signal.

Here, the term "digital signal" is a physical signal that is a representation of a sequence of discrete values (a quantified discrete-time signal), for example of an arbitrary bit stream, or of a digitized (sampled and analog-to-digital converted) analog signal.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a schematic of apparatus 100 that produces a reference PTAT current, in accordance with some embodiments. Apparatus 100 comprises p-type transistors Mp0, Mp1, and Mp2, n-type transistors Mn0 and Mn1, resistive device Rs, nodes nbias and pbias coupled as shown. Here, signal names and node names are interchangeably used. For example, nbias may present the bias voltage that biases transistors Mn0 and Mn1, or node nbias depending on the context of the sentence. Apparatus 100 produces PTAT current $I_{on}$. $I_{on}$ is the saturation current of transistor Mn1. This topology uses interlocked current mirrors (Mn0/Mn1 and Mp0/Mp1) and makes $I_{on}$ insensitive to supply voltage Vdd. Transistors Mn0 and Mn1 are stacked transistors so that their Vgs (gate-to-source voltage) are well above the threshold voltage (Vt) when they are ON with a resistance Rs of a few kOhm. Transistors Mn0 and Mn1 are also stacked so that their classical long-channel quadratic equation can reasonably describe their Ids-Vds relationship. Transistor Mn1 is made N times as wide as Mn1. Current $I_{on}$ can thus be given by:

$$I_{on} = \frac{2}{\mu_n C_{ox} \left(\frac{W}{L}\right)_n} \frac{1}{R_s^2} (1 - 1/\sqrt{N})^2 \qquad (1)$$

where $$\left(\frac{W}{L}\right)_n$$

is of transistor Mn0, Rs is the resistance of Mn1's source resistor, and other notations/symbols, such as $\mu_n C_{ox}$, follow their usual meanings. Per simulation results, $I_{on}$ slightly increases with temperature as $\mu_n$ loss at hot is partially offset by Rs of TFR (thin-film resistor) which has TC of +200 ppm/° C.

Figures 2A, 2B:
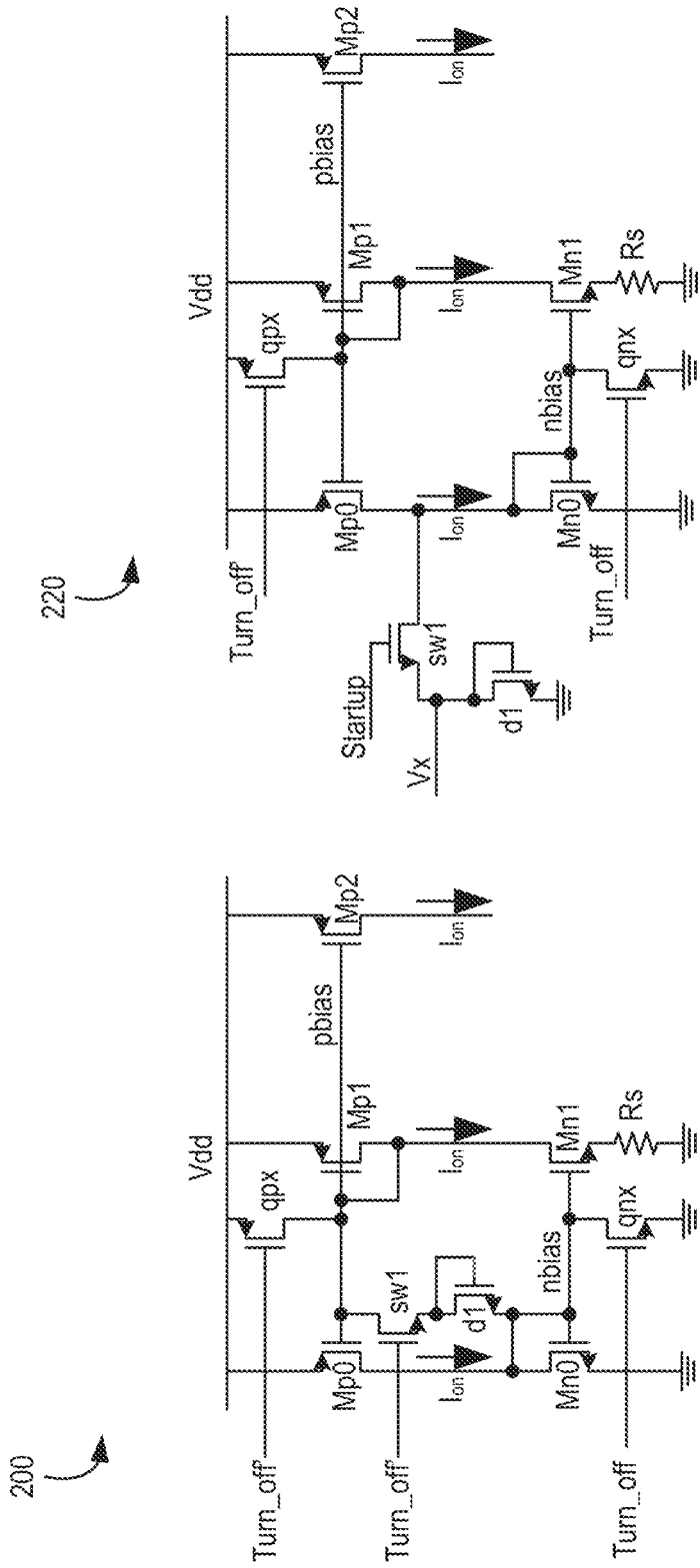
FIGS. 2A-B illustrate start-up circuitries, respectively, for the apparatus of FIG. 1, in accordance with some embodiments.

FIGS. 2A-B illustrate start-up circuitries 200 and 220, respectively, for circuit of FIG. 1, in accordance with some embodiments. Start-up circuitry 200 comprises p-type transistor qpx and n-type transistors sw1, d1, and qnx coupled as shown. Start-up circuitry 220 comprises p-type transistor qpx and n-type transistors sw1, d1, and qnx coupled as shown.

The $I_{on}$ generation circuit in FIG. 1 has two stable states—one is all transistors ON; the other is all transistors OFF. To ensure the circuit of FIG. 1 consumes no current when OFF and turns ON quickly, two possible startup embodiments are shown in FIG. 2A and FIG. 2B. The common part of FIG. 2A and FIG. 2B uses transistors qpx and qnx to turn off transistors Mp0, Mp1, Mp2, and Mn0, Mn1, respectively. In FIG. 2A, transistor d1 is turned ON through transistor sw1, connecting pbias and nbias. Transistor d1 then stays ON as soon as Turn_off (complementary of Turn_off) is HIGH. Transistor d1 may be heavily stacked to reduce its power dissipation.

In FIG. 2B, Vx may be provided by a voltage ladder or any other suitable voltage generator. Vx is high enough to turn transistor d1 ON when Startup is HIGH. In some embodiments, signal Startup is a pulse that is sufficiently wide (e.g., 30 ns) to activate feedback across transistors Mn0, Mn1, Mp1, and Mp0, therefore settling $I_{on}$. The startup circuit, while not shown in various embodiments for simplicity sake, can be added to the various embodiments described herein.

Figure 3:
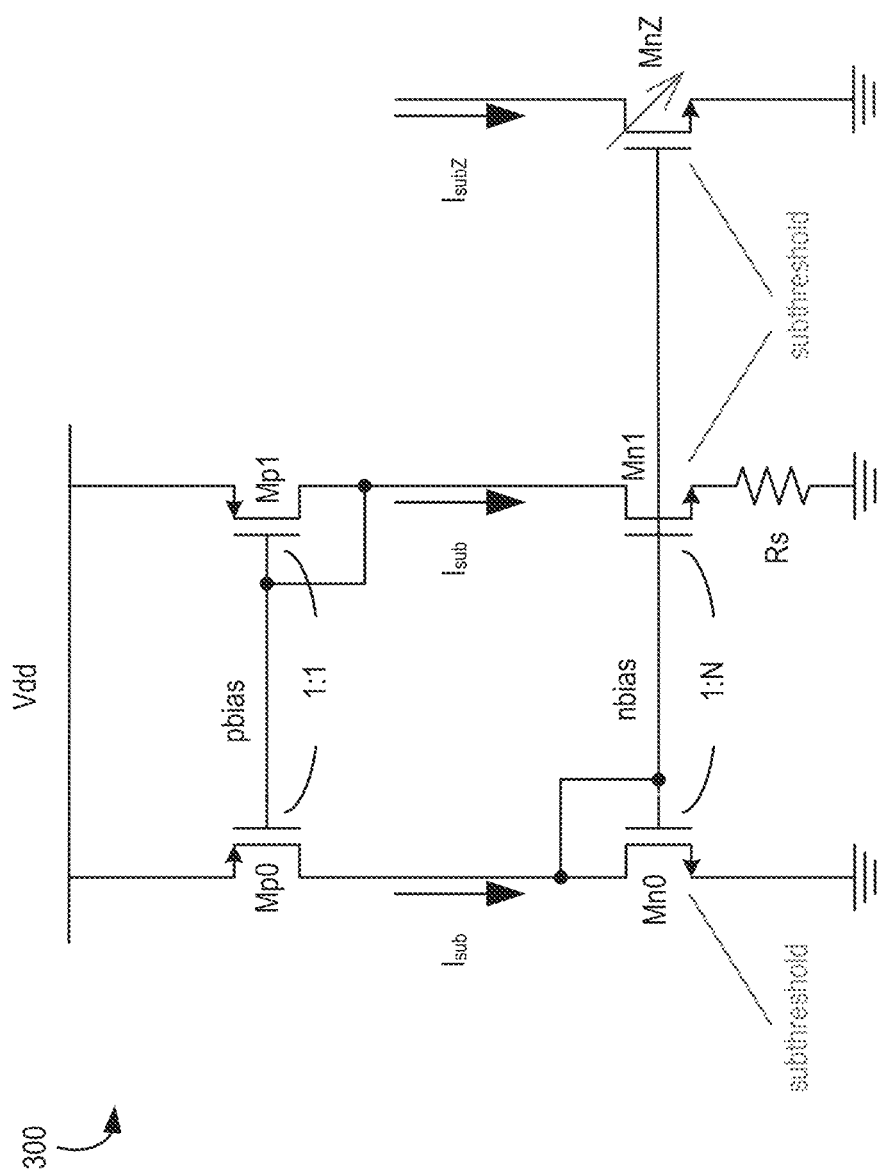
FIG. 3 illustrates a schematic of an apparatus that produces a reference PTAT current $I_{SUBZ}$ (a subthreshold current), in accordance with some embodiments.

FIG. 3 illustrates a schematic of apparatus 300 that produces a reference PTAT ($I_{sub}$) current, in accordance with some embodiments. Apparatus 300 comprises p-type transistors Mp0 and Mp1, n-type transistors Mn0, Mn1, and MnZ, resistive device Rs, nodes nbias and pbias coupled as shown. PTAT ($I_{sub}$) current has a much steeper positive TC. The topology looks the same as that in FIG. 1, but transistors Mn0 and Mn1 are biased in the subthreshold region by sizing widths of transistors Mn0, Mn1, and a tunable transistor MnZ, and sizing Rs near, for example, 10 kOhm. When transistors Mn0, Mn1, and MnZ are size much larger than transistors Mp0 and Mp1, subthreshold current is realized.

In subthreshold region, the drain current of Mn0 can be approximated by $$I_{sub} = \left(\frac{W}{L}\right)_0 I_0 \cdot \exp\left(\frac{V_{gs0}}{mV_T}\right) \quad (2)$$

where $I_0$ represents $$\mu_n \sqrt{(\epsilon_{Si} q N_a / 4\varphi_B)} \left[1 - \exp\left(\frac{-V_{ds0}}{V_T}\right)\right] \exp\left(\frac{-V_{tn}}{mV_T}\right)$$

with $V_T$ as thermal voltage, $V_{tn}$ as the n-type threshold voltage, m as the body effect coefficient and other parameters in solid-state literatures. Once the $V_{ds0}$ is greater than a few $V_T$, the term in the bracket is approaching 1. Here, m is very close to 1 for finFET as its subthreshold slope is close to 60 mV/decade.

Since $Vgs0 = Vgs1 + I_{sub}Rs$, $V_{gs0}$ can be expressed as:

$$V_{gs0} = mV_T \ln\left(\frac{I_{sub}}{\left(\frac{W}{L}\right)_0 I_0}\right) = V_{sg1} + I_{sub}Rs = mV_T \ln\left(\frac{I_{sub}}{\left(\frac{NW}{L}\right)_0 I_0}\right) + I_{sub}Rs \quad (2)$$

Rearrangement results in PTAT $I_{sub}$:

$$I_{sub} = \frac{1}{Rs} mV_T \ln(N) \approx \frac{1}{Rs} V_T \ln(N) \quad (3)$$

In some embodiments, temperature sensitivity or TC can be increased by choosing low Rs and/or a large N.

Figure 4:
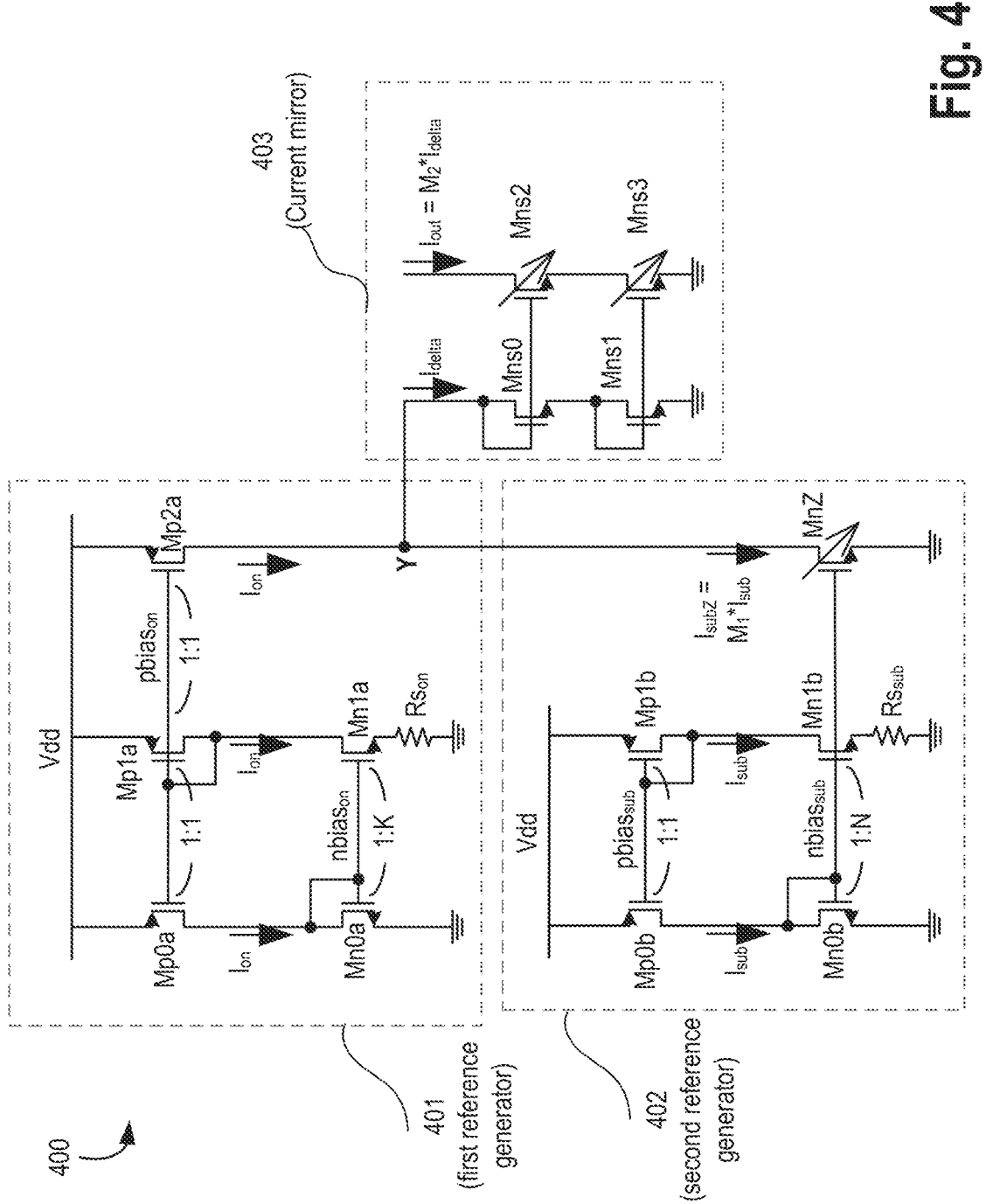
FIG. 4 illustrates a schematic a bandgap-less apparatus with tunable current multipliers, in accordance with some embodiments.

FIG. 4 illustrates a schematic a bandgap-less apparatus 400 with tunable current multipliers, in accordance with some embodiments. Apparatus 400 comprises first reference generator 401 (e.g., apparatus 100 of FIG. 1), second reference generator 402 (e.g., apparatus 300 of FIG. 3), and current mirror 403. First reference generator 401 comprises p-type transistors Mp0a, Mp1a, and Mp2a, n-type transistors Mn0a and Mn1a, resistive device $Rs_{on}$, nodes $nbias_{on}$ and $pbias_{on}$ coupled as shown. Second reference generator 402 comprises p-type transistors Mp0b and Mp1b, n-type transistors Mn0b, Mn1b, and MnZ, resistive device $Rs_{sub}$, nodes $nbias_{sub}$ and $pbias_{sub}$ coupled as shown. Current mirror 403 comprises n-type transistors Mns0, Mns1, Mns2, and Mns3. Currently mirror 403 is coupled to first reference generator 401 and second reference generator 402 via node Y.

Here, two PTAT currents subtract at node Y:

$$I_{delta} = I_{on} - I_{subz}, \text{ or} \quad (4a)$$

$$I_{delta} \approx \frac{1}{R_s^2} \frac{1}{\mu_n C_{ox}\left(\frac{W}{L}\right)_{on}} \left(1 - \frac{1}{\sqrt{K}}\right) - \frac{M_1}{Rs} V_T \ln(N) \quad (4b)$$

where $M_1$ is the multiplier to $I_{sub}$, which gives $I_{sub}$, indicated by 402, and where $M_1$ is a programmable multiplier to electrically tune $I_{delta}$ level its TC. $I_{delta}$ is received by a low impedance circuitry, current mirror 403. $I_{delta}$ is a third reference current which is proportional to a difference between the second reference current ($I_{subz}$) and the first reference current ($I_{on}$). In some embodiments, the first reference current ($I_{on}$) has a first temperature coefficient which is positive and the second reference current ($I_{subz}$) has second temperature coefficient which is negative. In some embodiments, the first reference current ($I_{on}$) has a first temperature coefficient which is positive and the second reference current ($I_{subz}$) has second temperature coefficient which is positive such that the first temperature coefficient has a different slope than the second temperature coefficient. In some embodiments, the first reference current ($I_{on}$) has a first temperature coefficient which is negative and the second reference current ($I_{subz}$) has second temperature coefficient which is positive. In some embodiments, the first reference current ($I_{on}$) has a first temperature coefficient which is negative and the second reference current ($I_{subz}$) has a second temperature coefficient which is negative such that the first temperature coefficient has a different slope than the second temperature coefficient. Diode-connected transistors Mns0 and Mns1 are in series to improve the output impendence for the output current hut. Other techniques such as cascode, low-voltage cascode, can be applied instead for current mirror 403.

Figure 5A:
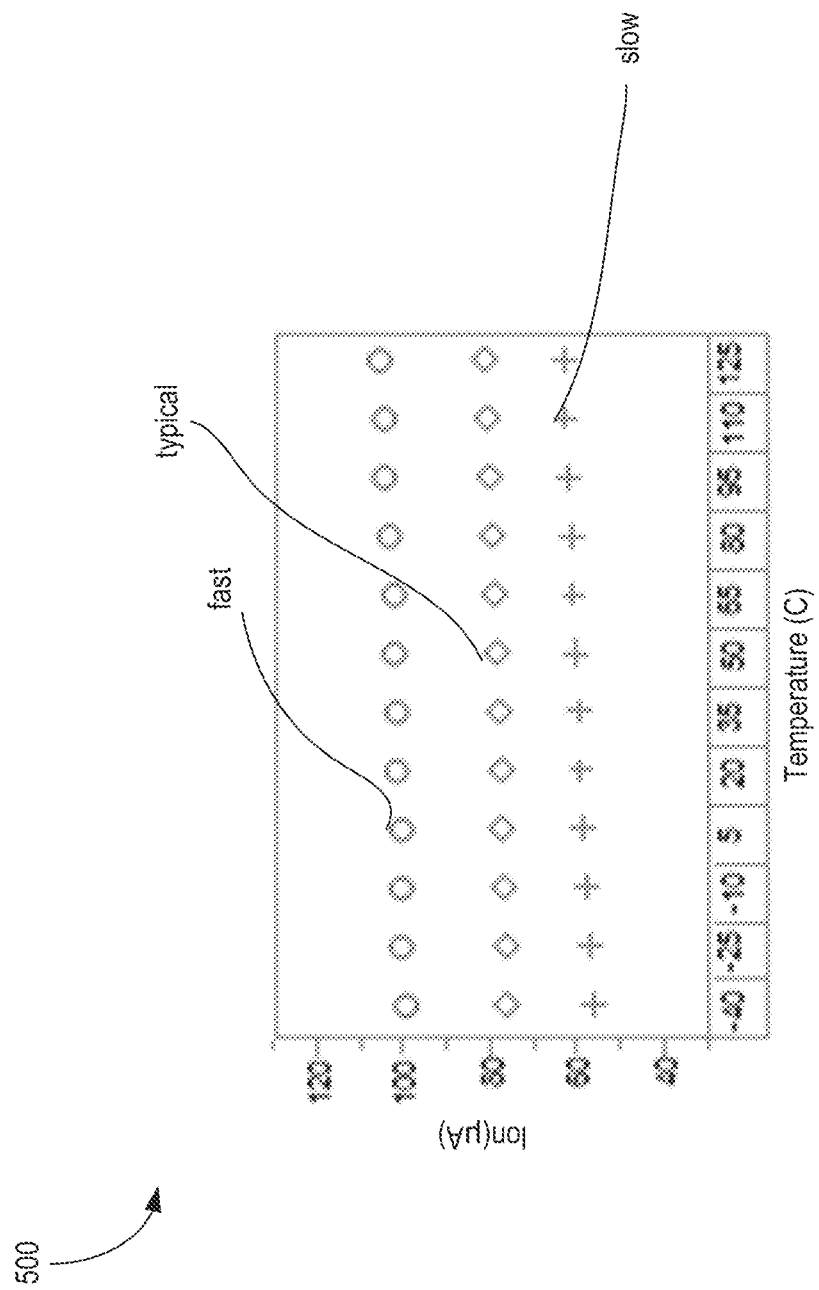
FIG. 5A illustrates a plot showing mild PTAT current $I_{ON}$ for the bandgap-less apparatus across fast, typical, and slow process corners, in accordance with some embodiments.
Figure 5B:
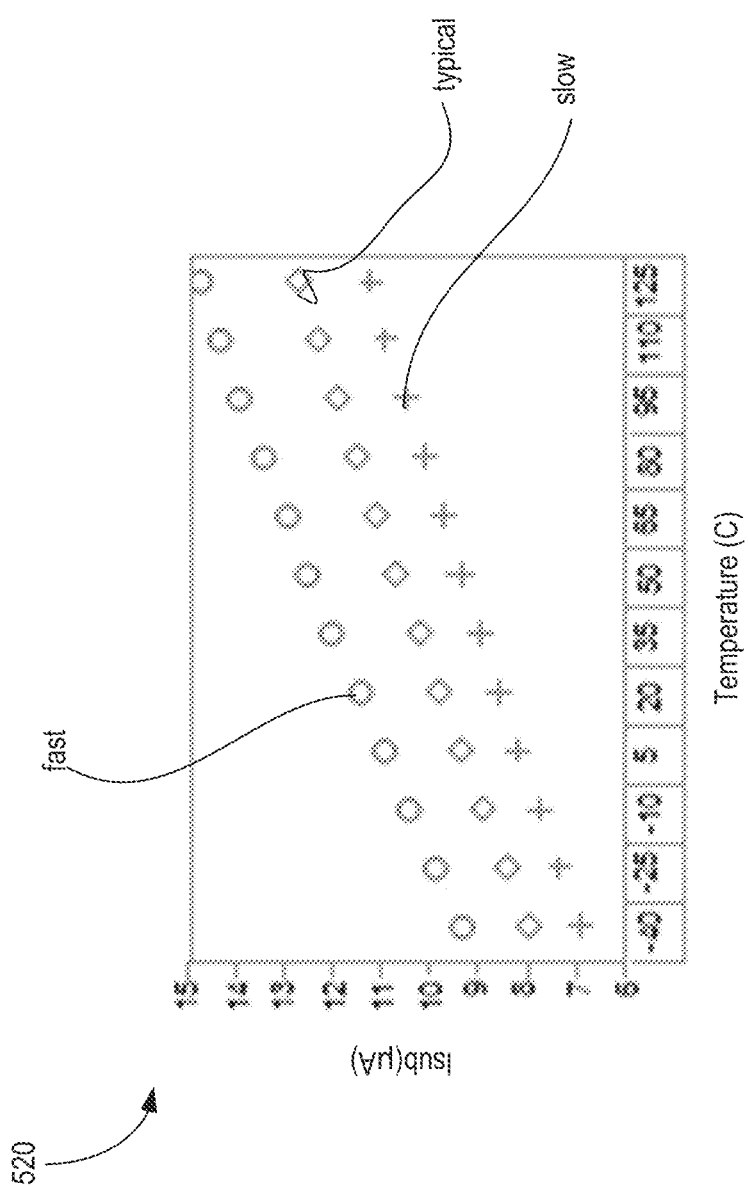
FIG. 5B illustrates a plot showing steeper PTAT current $I_{SUBZ}$ (or $I_{SUB}$) for the bandgap-less apparatus across fast, typical, and slow process corners, in accordance with some embodiments.
Figure 5C:
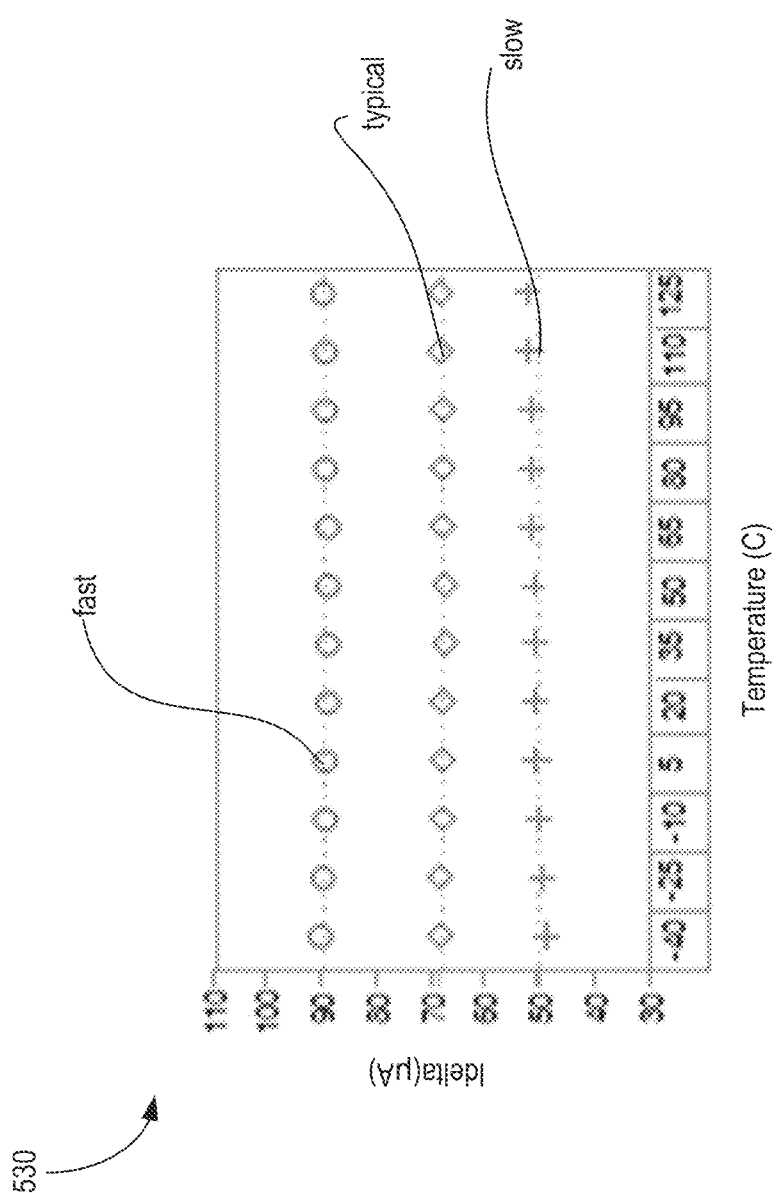
FIG. 5C illustrates a plot showing resulting subtracted current $I_{DELTA}$ ($I_{ON}-I_{SUBZ}$) of near zero or zero TC for the bandgap-less apparatus across fast, typical, and slow process corners, in accordance with some embodiments.

FIG. 5A illustrates plot 500 showing mild PTAT $I_{ON}$ for the bandgap-less apparatus across fast, typical, and slow process corners, in accordance with some embodiments. FIG. 5B illustrates plot 520 showing steeper PTAT $I_{SUBZ}$ (or $I_{SUB}$) for the bandgap-less apparatus across fast, typical, and slow process corners, in accordance with some embodiments. FIG. 5C illustrates plot 530 showing resulting subtracted $I_{DELTA}$ ($I_{ON}-I_{SUBZ}$) of near zero TC for the bandgap-less apparatus across fast, typical, and slow process corners, in accordance with some embodiments.

In this example, Vdd is set to 0.95V. One single set of configuration is used across corners of fast, typical, and slow. Note at the same temperature, Vtn (span is approximately 175 mV from fast to slow, a fairly wide threshold voltage window. Plots 500, 520, and 530 show the simulation results from −40° C. to 125° C. $I_{on}$ has a higher current level and a mild positive TC, while $I_{sub}$ has lower current level and a larger positive TC. The subtracted current $I_{delta}$ shows near zero TC. The different current levels of the three process corners can be trimmed for uniformly by applying different $M_2$. $M_2$ is the multiplier shown by current mirror 403.

Figure 6:
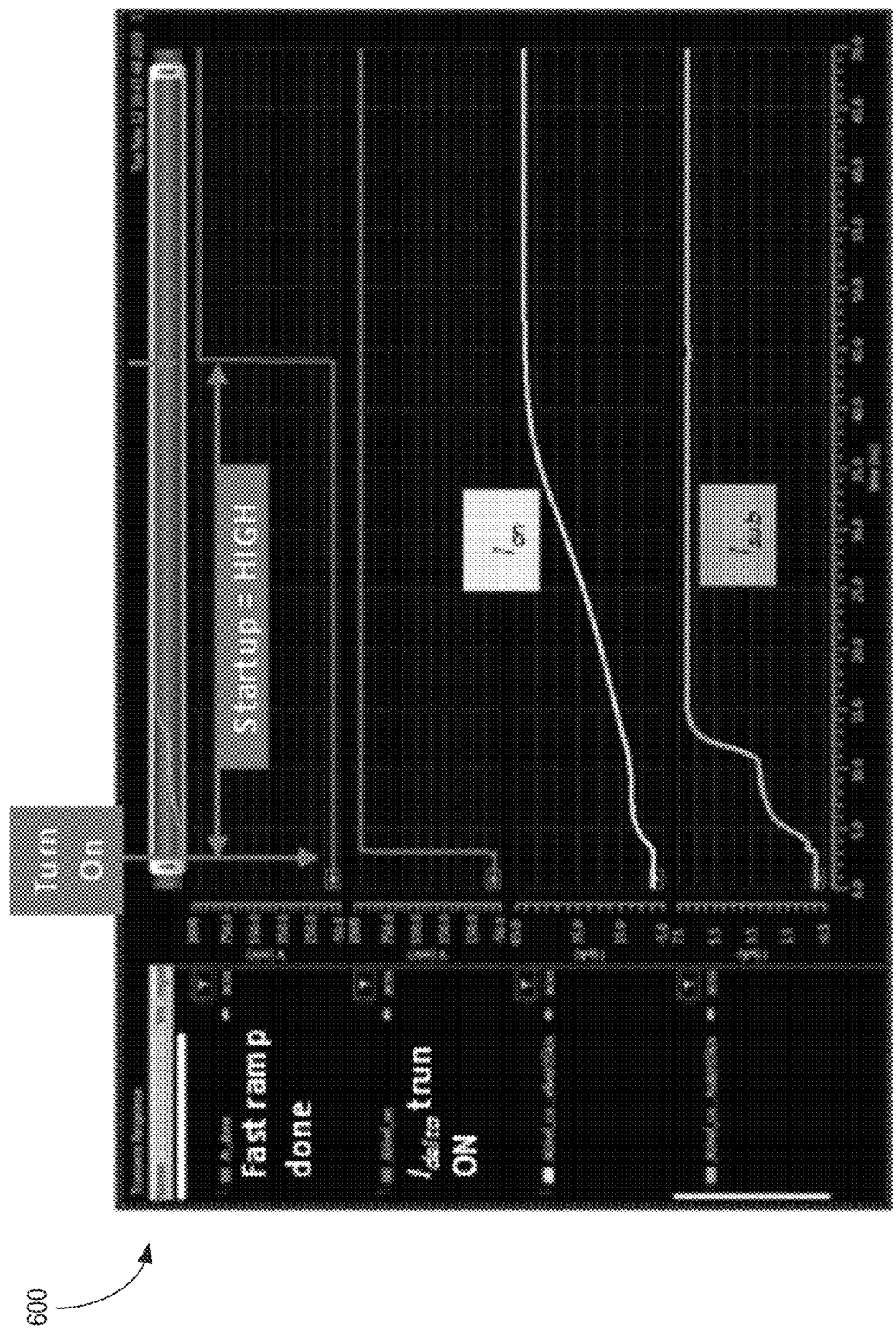
FIG. 6 illustrates a plot showing simulated circuit settling behavior and time of the bandgap-less apparatus, in accordance with some embodiments.

FIG. 6 illustrates plot 600 showing simulated circuit settling behavior and time of the bandgap-less apparatus, in accordance with some embodiments. Plot 600 shows the start-up behavior at slow, −40° C. In this example, the startup (pulse) window is 40 ns where both $I_{on}$ and $I_{sub}$ reached their 95% steady-state levels.

Figure 7:
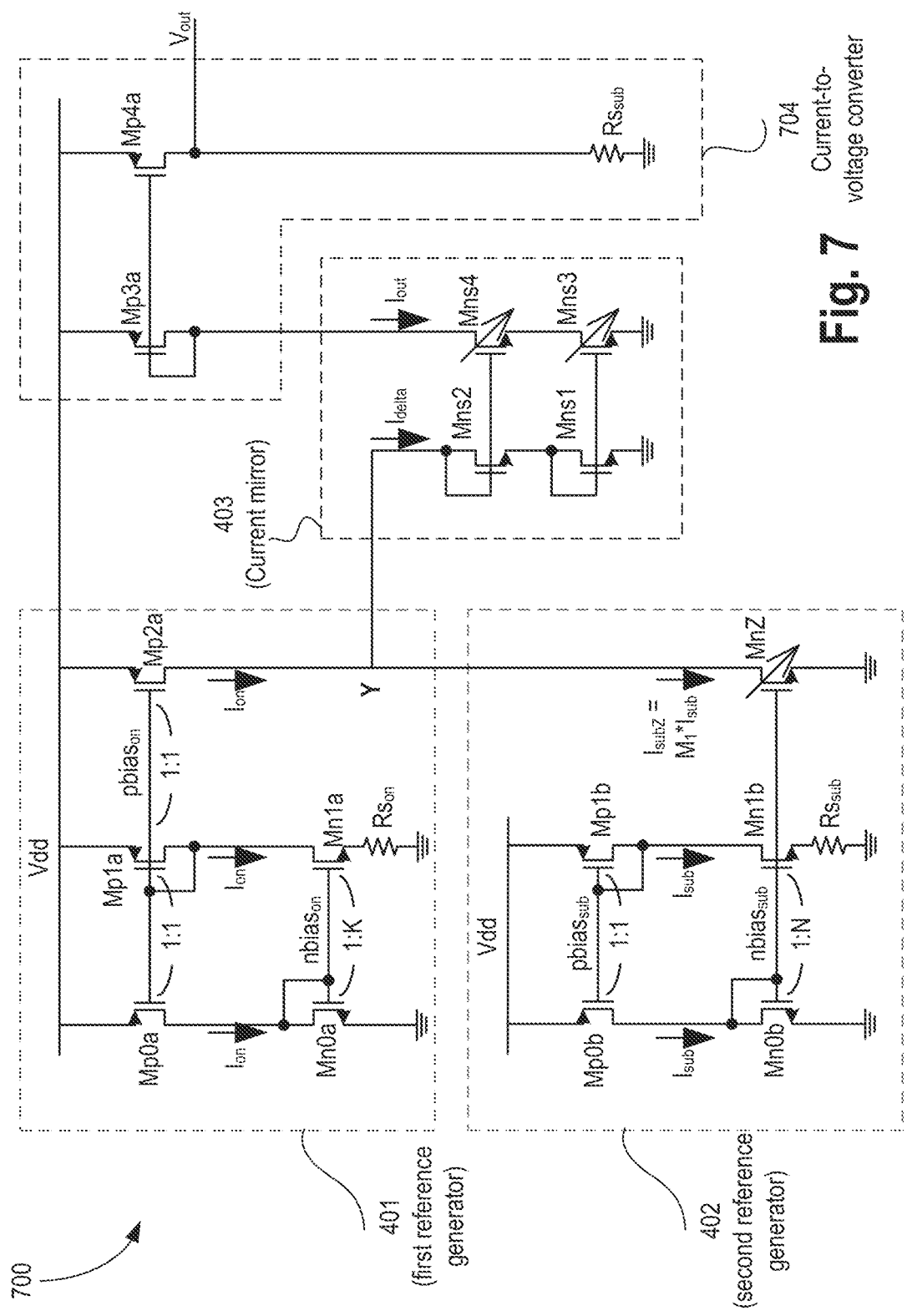
FIG. 7 illustrates the bandgap-less reference generator with n-type current mirror for $I_{DELTA}$, in accordance with some embodiments.

FIG. 7 illustrates the bandgap-less reference generating apparatus 700 with n-type current mirror for $I_{DELTA}$, in accordance with some embodiments. Apparatus 700 is same as apparatus 400 but for the current-to-voltage converter 704. Current-to-voltage converter 704 comprises p-type transistors Mp3a and Mp4a, and resistive device $Rs_{sub}$ (e.g., 5.76 kPhm TFR at typical process corner). Current-to-voltage converter 704 converts current $I_{delta}$ into a voltage representation Vout. Current-to-voltage converter 704 mirrors $I_{out}$ via transistors MP3a and Mp4a and flows the mirrored current through a resistor ladder or lumped resistor $Rs_{su}b$ to generate Vout.

Figure 8:
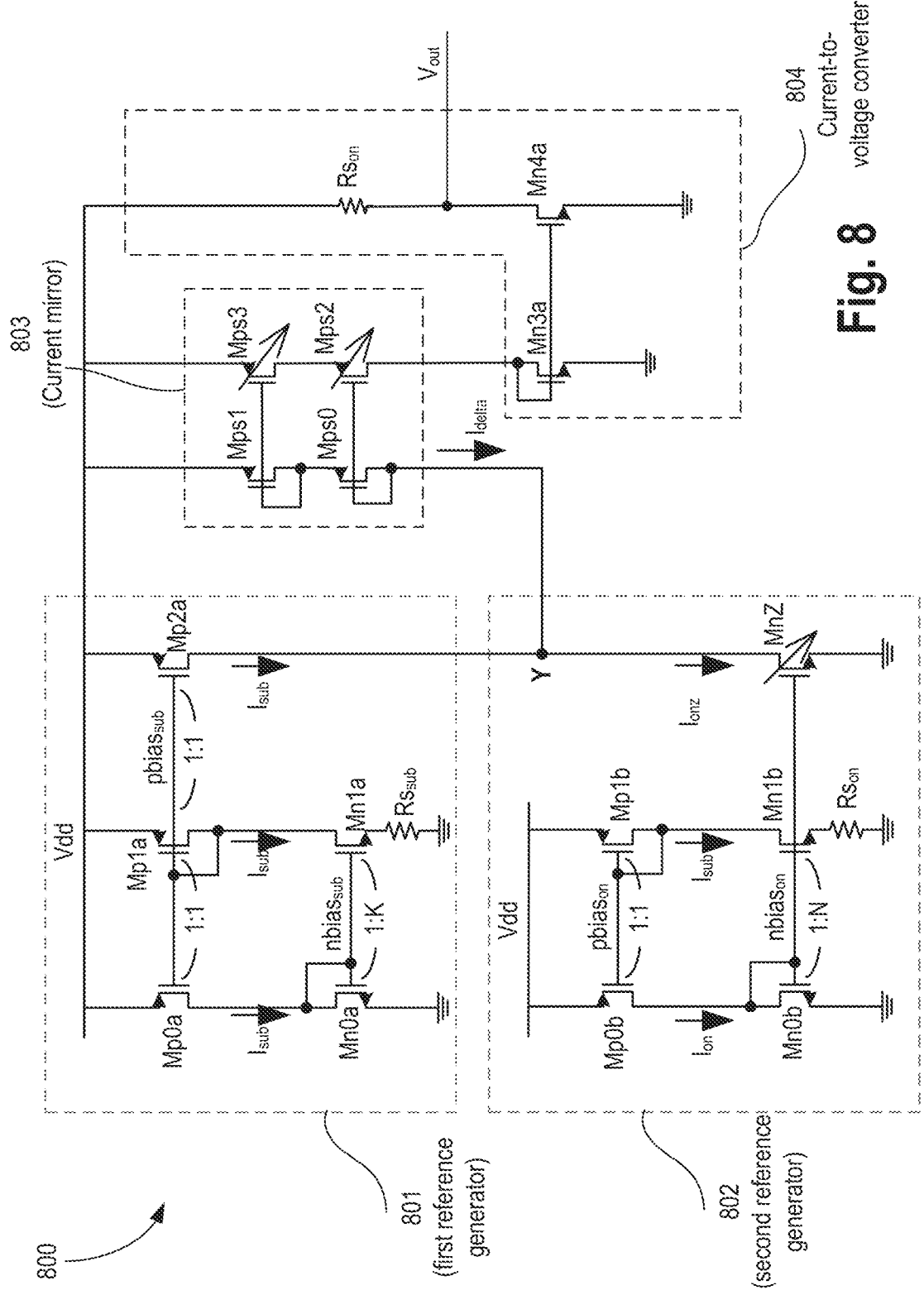
FIG. 8 illustrates the bandgap-less reference generator with p-type current mirror for $I_{DELTA}$, in accordance with some embodiments.

FIG. 8 illustrates the bandgap-less reference generating apparatus 800 with p-type current mirror for $I_{DELTA}$, in accordance with some embodiments. Apparatus 800 comprises first reference generator 801, second reference generator 802, current mirror 803, and current-to-voltage generator 804. First reference generator 801 comprises p-type transistors Mp0a, Mp1a, and Mp2a, n-type transistors Mn0a and Mn1a, resistive device $Rs_{sub}$, nodes $nbias_{sub}$ and $pbias_{sub}$ coupled as shown. Second reference generator 802 comprises p-type transistors Mp0b and Mp1b, n-type transistors Mn0b, Mn1b, and MnZ, resistive device $Rs_{on}$, nodes $nbias_{on}$ and $pbias_{on}$ coupled as shown. Current mirror 803 comprises p-type transistors Mps0, Mps1, Mps2, and Mps3. Currently mirror 803 is coupled to first reference generator 801 and second reference generator 802 via node Y. Current-to-voltage converter 804 comprises n-type transistors Mn3a and Mn4a, and resistive device Rs. (e.g., 5.76 kOhm TFR at typical process corner). Current-to-voltage converter 804 converts current $I_{delta}$ into a voltage representation Vout. Current-to-voltage converter 804 mirrors $I_{out}$ via transistors Mn3a and Mn4a and flows the mirrored current through a resistor ladder or lumped resistor $Rs_{on}$ to generate Vout.

Apparatus 800 is a flipped version of apparatus 700 that uses a p-type current mirror 803 and n-type current-to-voltage converter 804. Further, first reference generator 801 generates a subthreshold PTAT $I_{sub}$ current while second reference generator 802 generates the saturation PTAT current $I_{sub}$, where 'x' is the multiplying factor by transistor MnZ. The different of these two currents is provided as $I_{delta}$ to current mirror 803.

$I_{delta}$ is a third reference current is proportional to a difference between the second reference current ($I_{onz}$) and the first reference current ($I_{sub}$). In some embodiments, the first reference current ($I_{sub}$) has a first temperature coefficient which is positive and the second reference current ($I_{onz}$) has second temperature coefficient which is negative. In some embodiments, the first reference current ($I_{sub}$) has a first temperature coefficient which is positive and the second reference current ($I_{onz}$) has second temperature coefficient which is positive such that the first temperature coefficient has a different slope than the second temperature coefficient. In some embodiments, the first reference current ($I_{sub}$) has a first temperature coefficient which is negative and the second reference current ($I_{onz}$) has second temperature coefficient which is positive. In some embodiments, the first reference current ($I_{sub}$) has a first temperature coefficient which is negative and the second reference current ($I_{onz}$) has second temperature coefficient which is negative such that the first temperature coefficient has a different slope than the second temperature coefficient. Current-to-voltage converter 804 converts the $I_{delta}$ to a corresponding reference voltage Vout.

The resistive devices $Rs_{on}$, $Rs_{sub}$, Rs can be made using any suitable technology. For example, these resistive devices are transistors operating in linear region, transistors implemented as TFR, etc.

Figure 9:
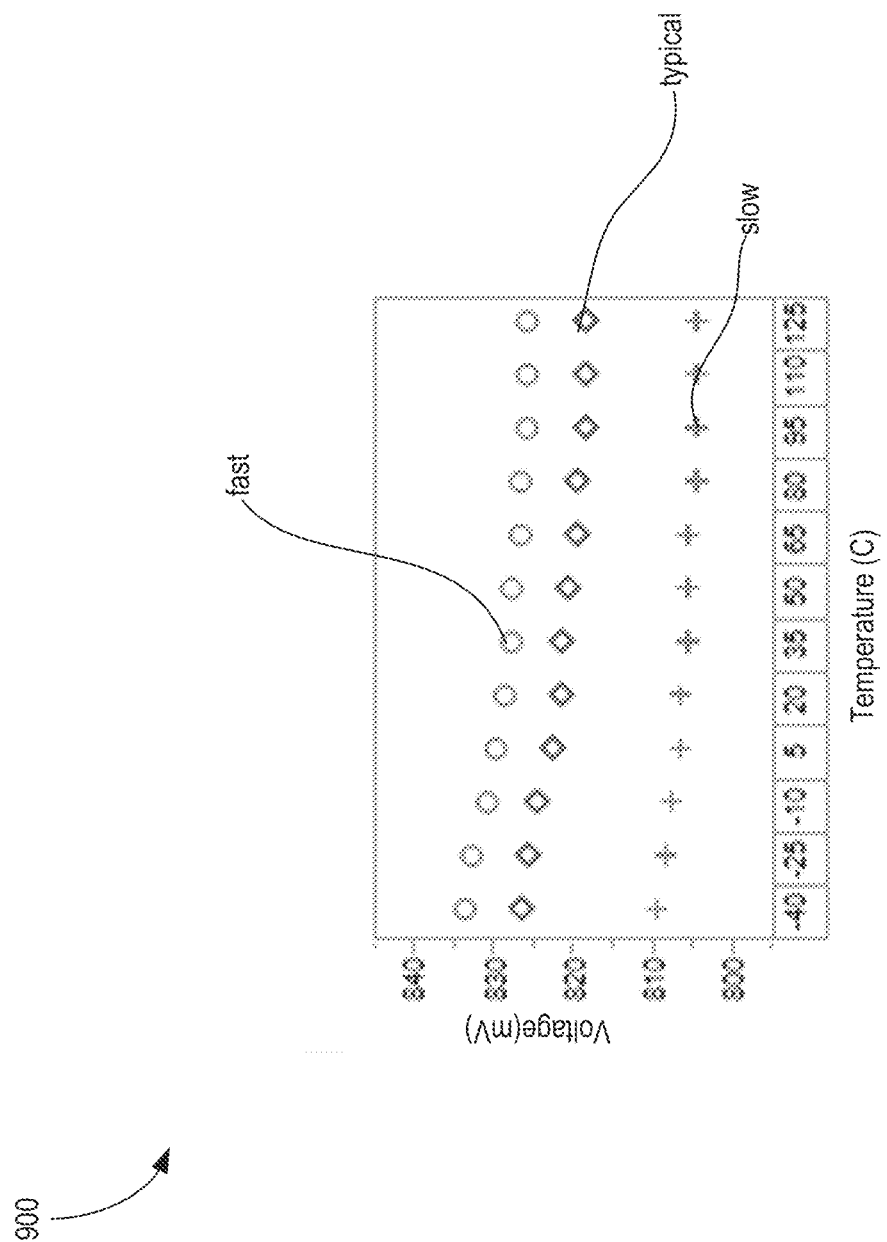
FIG. 9 illustrates a plot showing output voltage Vout across fast, typical, and slow process corners, in accordance with some embodiments.

FIG. 9 illustrates plot 900 showing output voltage Vout across fast, typical, and slow process corners, in accordance with some embodiments. The worst case here is at fast corner showing 8 mV difference from −40° C. to 125° C. while the nominal output level is approximately 830 mV. Not shown here, but a uniform $V_{out}$ level across corners can be achieved by tapping out different levels if Rsub is made of a resistor ladder, in accordance with some embodiments.

Table 1 illustrates an overall comparison in a sub 10 nm CMOS process technology between a digital thermal sensor (DST) BGREF and the current or voltage reference generator of some embodiments for various parameters. Some major benefits are in the fast settling times, lower Vcc, smaller area, current handling capabilities, and a simple design as both OpAmp and BGdiodes are not needed in accordance with some embodiments.

TABLE 1

| Parameter | DTS BGREF | Reference Current Generation apparatus 400 | Reference Voltage Generation apparatus 700 |
| --- | --- | --- | --- |
| Vdd(V) | 1.8 Typical (1.4-1.89) | 0.95 typical | 0.95 typical |
| Area (μm²) | Approx. 70 × 90 | 7 × 16 | 9 × 16 |
| Temperature range | −40 C. to 125 C. | −40 C. to 125 C. | −40 C. to 125 C. |
| Current (Typical) | Approx. 700 μA | Approx. 300 μA | Approx. 450 μA |
| Settling Time | 1 μS-4 μS | 40 nS | 40 nS |
| DC PSRR | −30 dB or better | −15 dB if no Vdd regulator | −15 dB if no Vdd regulator |
| AC PSRR | −30 dB or better | −15 dB if no Vdd regulator | −15 dB if no Vdd regulator |
| BGDiode | Needed | none | none |
| Operation Amplifier (OpAMP) | Needed | none | none |
| Output Random Variation | 20 mV/sigma | 1.9%/sigma | 5.3 mV/sigma |
| Trimmable Vbg | 0.68-1 V (0.8 V mid) | N/A | Flexible up to (Vdd-0.1 mV) |

Figure 10:
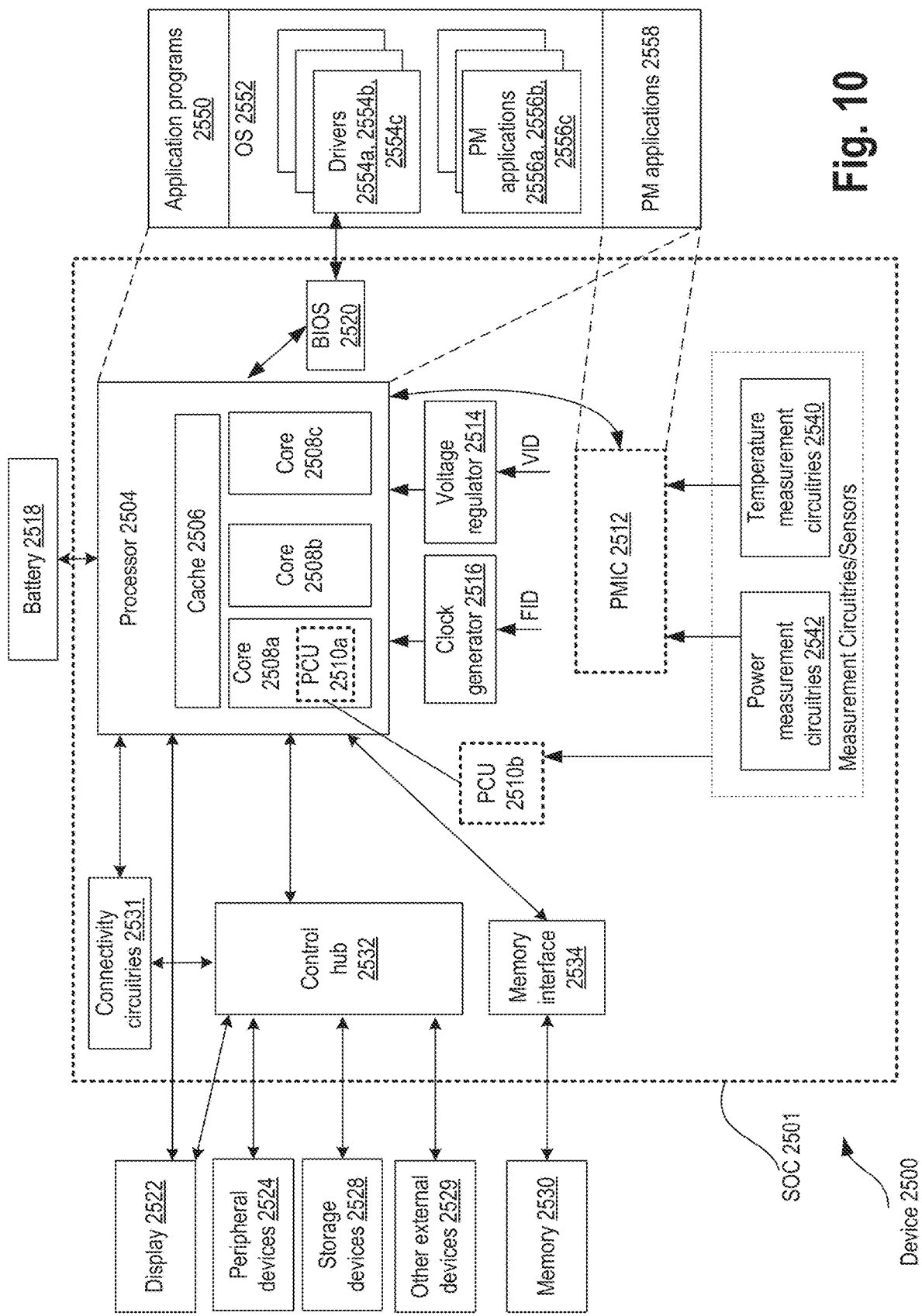
FIG. 10 illustrates a smart device, or a computer system, or a SoC (System-on-Chip) bandgap-less reference generator, according to some embodiments of the disclosure.

FIG. 10 illustrates a smart device, or a computer system, or a SoC (System-on-Chip) bandgap-less reference generator, according to some embodiments of the disclosure. In some embodiments, device 2500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2500. Any components here can have the bandgap-less reference generator. The bandgap-less apparatus is a fast settling circuit using differences of proportional-to-absolute-temperature only (PTAT-only) currents, to generate close to zero temperature coefficient (TC) reference current or voltage. Unlike a bandgap reference, it does not need a bandgap diode, nor an amplifier, and also has current handling capabilities.

In an example, the device 2500 comprises a SoC (System-on-Chip) 2501. An example boundary of the SOC 2501 is illustrated using dotted lines in FIG. 10, with some example components being illustrated to be included within SOC 2501—however, SOC 2501 may include any appropriate components of device 2500.

In some embodiments, device 2500 includes processor 2504. Processor 2504 can include one or more physical devices, such as microprocessors, application processors, microcontrollers, programmable logic devices, processing cores, or other processing means. The processing operations performed by processor 2504 include the execution of an operating platform or operating system on which applications and/or device functions are executed. The processing operations include operations related to I/O (input/output) with a human user or with other devices, operations related to power management, operations related to connecting computing device 2500 to another device, and/or the like. The processing operations may also include operations related to audio I/O and/or display I/O.

In some embodiments, processor 2504 includes multiple processing cores (also referred to as cores) 2508*a*, 2508*b*, 2508*c*. Although merely three cores 2508*a*, 2508*b*, 2508*c* are illustrated, processor 2504 may include any other appropriate number of processing cores, e.g., tens, or even hundreds of processing cores. Processor cores 2508*a*, 2508*b*, 2508*c* may be implemented on a single integrated circuit (IC) chip. Moreover, the chip may include one or more shared and/or private caches, buses or interconnections, graphics and/or memory controllers, or other components.

In some embodiments, processor 2504 includes cache 2506. In an example, sections of cache 2506 may be dedicated to individual cores 2508 (e.g., a first section of cache 2506 dedicated to core 2508*a*, a second section of cache 2506 dedicated to core 2508*b*, and so on). In an example, one or more sections of cache 2506 may be shared among two or more of cores 2508. Cache 2506 may be split in different levels, e.g., level 1 (L1) cache, level 2 (L2) cache, level 3 (L3) cache, etc.

In some embodiments, processor core 2504 may include a fetch unit to fetch instructions (including instructions with conditional branches) for execution by the core 2504. The instructions may be fetched from any storage devices such as the memory 2530. Processor core 2504 may also include a decode unit to decode the fetched instruction. For example, the decode unit may decode the fetched instruction into a plurality of micro-operations. Processor core 2504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2504 may be an out-of-order processor core in one embodiment. Processor core 2504 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 2504 may also include a bus unit to enable communication between components of the processor core 2504 and other components via one or more buses. Processor core 2504 may also include one or more registers to store data accessed by various components of the core 2504 (such as values related to assigned app priorities and/or sub-system states (modes) association.

In some embodiments, device 2500 comprises connectivity circuitries 2531. For example, connectivity circuitries 2531 includes hardware devices (e.g., wireless and/or wired connectors and communication hardware) and/or software components (e.g., drivers, protocol stacks), e.g., to enable device 2500 to communicate with external devices. Device 2500 may be separate from the external devices, such as other computing devices, wireless access points or base stations, etc.

In an example, connectivity circuitries 2531 may include multiple different types of connectivity. To generalize, the connectivity circuitries 2531 may include cellular connectivity circuitries, wireless connectivity circuitries, etc. Cellular connectivity circuitries of connectivity circuitries 2531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2531 may include a network interface, such as a wired or wireless interface, e.g., so that a system embodiment may be incorporated into a wireless device, for example, cell phone or personal digital assistant.

In some embodiments, device 2500 comprises control hub 2532, which represents hardware devices and/or software components related to interaction with one or more I/O devices. For example, processor 2504 may communicate with one or more of display 2522, one or more peripheral devices 2524, storage devices 2528, one or more other external devices 2529, etc., via control hub 2532. Control hub 2532 may be a chipset, a Platform Control Hub (PCH), and/or the like.

For example, control hub 2532 illustrates one or more connection points for additional devices that connect to device 2500, e.g., through which a user might interact with the system. For example, devices (e.g., devices 2529) that can be attached to device 2500 include microphone devices, speaker or stereo systems, audio devices, video systems or other display devices, keyboard or keypad devices, or other I/O devices for use with specific applications such as card readers or other devices.

As mentioned above, control hub 2532 can interact with audio devices, display 2522, etc. For example, input through a microphone or other audio device can provide input or commands for one or more applications or functions of device 2500. Additionally, audio output can be provided instead of, or in addition to display output. In another example, if display 2522 includes a touch screen, display 2522 also acts as an input device, which can be at least partially managed by control hub 2532. There can also be additional buttons or switches on computing device 2500 to provide I/O functions managed by control hub 2532. In one embodiment, control hub 2532 manages devices such as accelerometers, cameras, light sensors or other environmental sensors, or other hardware that can be included in device 2500. The input can be part of direct user interaction, as well as providing environmental input to the system to influence its operations (such as filtering for noise, adjusting displays for brightness detection, applying a flash for a camera, or other features).

In some embodiments, control hub 2532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2522 represents hardware (e.g., display devices) and software (e.g., drivers) components that provide a visual and/or tactile display for a user to interact with device 2500. Display 2522 may include a display interface, a display screen, and/or hardware device used to provide a display to a user. In some embodiments, display 2522 includes a touch screen (or touch pad) device that provides both output and input to a user. In an example, display 2522 may communicate directly with the processor 2504. Display 2522 can be one or more of an internal display device, as in a mobile electronic device or a laptop device or an external display device attached via a display interface (e.g., DisplayPort, etc.). In one embodiment display 2522 can be a head mounted display (HMD) such as a stereoscopic display device for use in virtual reality (VR) applications or augmented reality (AR) applications.

In some embodiments and although not illustrated in the figure, in addition to (or instead of) processor 2504, device 2500 may include Graphics Processing Unit (GPU) comprising one or more graphics processing cores, which may control one or more aspects of displaying contents on display 2522.

Control hub 2532 (or platform controller hub) may include hardware interfaces and connectors, as well as software components (e.g., drivers, protocol stacks) to make peripheral connections, e.g., to peripheral devices 2524.

It will be understood that device 2500 could both be a peripheral device to other computing devices, as well as have peripheral devices connected to it. Device 2500 may have a "docking" connector to connect to other computing devices for purposes such as managing (e.g., downloading and/or uploading, changing, synchronizing) content on device 2500. Additionally, a docking connector can allow device 2500 to connect to certain peripherals that allow computing device 2500 to control content output, for example, to audiovisual or other systems.

In addition to a proprietary docking connector or other proprietary connection hardware, device 2500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2531 may be coupled to control hub 2532, e.g., in addition to, or instead of, being coupled directly to the processor 2504. In some embodiments, display 2522 may be coupled to control hub 2532, e.g., in addition to, or instead of, being coupled directly to processor 2504.

In some embodiments, device 2500 comprises memory 2530 coupled to processor 2504 via memory interface 2534. Memory 2530 includes memory devices for storing information in device 2500. Memory can include nonvolatile (state does not change if power to the memory device is interrupted) and/or volatile (state is indeterminate if power to the memory device is interrupted) memory devices. Memory device 2530 can be a dynamic random access memory (DRAM) device, a static random access memory (SRAM) device, flash memory device, phase-change memory device, or some other memory device having suitable performance to serve as process memory. In one embodiment, memory 2530 can operate as system memory for device 2500, to store data and instructions for use when the one or more processors 2504 executes an application or process. Memory 2530 can store application data, user data, music, photos, documents, or other data, as well as system data (whether long-term or temporary) related to the execution of the applications and functions of device 2500.

Elements of various embodiments and examples are also provided as a machine-readable medium (e.g., memory 2530) for storing the computer-executable instructions (e.g., instructions to implement any other processes discussed herein). The machine-readable medium (e.g., memory 2530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2500 comprises temperature measurement circuitries 2540, e.g., for measuring temperature of various components of device 2500. In an example, temperature measurement circuitries 2540 may be embedded, or coupled or attached to various components, whose temperature are to be measured and monitored. For example, temperature measurement circuitries 2540 may measure temperature of (or within) one or more of cores 2508a, 2508b, 2508c, voltage regulator 2514, memory 2530, a mother-board of SOC 2501, and/or any appropriate component of device 2500.

In some embodiments, device 2500 comprises power measurement circuitries 2542, e.g., for measuring power consumed by one or more components of the device 2500. In an example, in addition to, or instead of, measuring power, the power measurement circuitries 2542 may measure voltage and/or current. In an example, the power measurement circuitries 2542 may be embedded, or coupled or attached to various components, whose power, voltage, and/or current consumption are to be measured and monitored. For example, power measurement circuitries 2542 may measure power, current and/or voltage supplied by one or more voltage regulators 2514, power supplied to SOC 2501, power supplied to device 2500, power consumed by processor 2504 (or any other component) of device 2500, etc.

In some embodiments, device 2500 comprises one or more voltage regulator circuitries, generally referred to as voltage regulator (VR) 2514. VR having a high bandwidth and low power differential-to-single-ended type-III compensator. VR 2514 generates signals at appropriate voltage levels, which may be supplied to operate any appropriate components of the device 2500. Merely as an example, VR 2514 is illustrated to be supplying signals to processor 2504 of device 2500. In some embodiments, VR 2514 receives one or more Voltage Identification (VID) signals, and generates the voltage signal at an appropriate level, based on the VID signals. Various type of VRs may be utilized for the VR 2514. For example, VR 2514 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 2510a/b and/or PMIC 2512. In some embodiments, each core has a network of distributed LDOs to provide efficient control for power management. The LDOs can be digital, analog, or a combination of digital or analog LDOs. The VR is an adaptive VR that can provide an adaptive voltage output as discussed with reference to various embodiments.

In some embodiments, device 2500 comprises one or more clock generator circuitries, generally referred to as clock generator 2516. Clock generator 2516 generates clock signals at appropriate frequency levels, which may be supplied to any appropriate components of device 2500. Merely as an example, clock generator 2516 is illustrated to be supplying clock signals to processor 2504 of device 2500. In some embodiments, clock generator 2516 receives one or more Frequency Identification (FID) signals, and generates the clock signals at an appropriate frequency, based on the FID signals. Clock generator 2516 is an adaptive clock source that can provide an adaptive frequency output as discussed with reference to various embodiments.

In some embodiments, device 2500 comprises battery 2518 supplying power to various components of device 2500. Merely as an example, battery 2518 is illustrated to be supplying power to processor 2504. Although not illustrated in the figures, device 2500 may comprise a charging circuitry, e.g., to recharge the battery, based on Alternating Current (AC) power supply received from an AC adapter.

In some embodiments, device 2500 comprises Power Control Unit (PCU) 2510 (also referred to as Power Management Unit (PMU), Power Controller, etc.). In an example, some sections of PCU 2510 may be implemented by one or more processing cores 2508, and these sections of PCU 2510 are symbolically illustrated using a dotted box and labelled PCU 2510a. In an example, some other sections of PCU 2510 may be implemented outside the processing cores 2508, and these sections of PCU 2510 are symbolically illustrated using a dotted box and labelled as PCU 2510b. PCU 2510 may implement various power management operations for device 2500. PCU 2510 may include hardware interfaces, hardware circuitries, connectors, registers, etc., as well as software components (e.g., drivers, protocol stacks), to implement various power management operations for device 2500.

In some embodiments, device 2500 comprises Power Management Integrated Circuit (PMIC) 2512, e.g., to implement various power management operations for device 2500. In some embodiments, PMIC 2512 is a Reconfigurable Power Management ICs (RPMICs) and/or an IMVP (Intel® Mobile Voltage Positioning). In an example, the PMIC is within an IC chip separate from processor 2504. The may implement various power management operations for device 2500. PMIC 2512 may include hardware interfaces, hardware circuitries, connectors, registers, etc., as well as software components (e.g., drivers, protocol stacks), to implement various power management operations for device 2500.

In an example, device 2500 comprises one or both PCU 2510 or PMIC 2512. In an example, any one of PCU 2510 or PMIC 2512 may be absent in device 2500, and hence, these components are illustrated using dotted lines.

Various power management operations of device 2500 may be performed by PCU 2510, by PMIC 2512, or by a combination of PCU 2510 and PMIC 2512. For example, PCU 2510 and/or PMIC 2512 may select a power state (e.g., P-state) for various components of device 2500. For example, PCU 2510 and/or PMIC 2512 may select a power state (e.g., in accordance with the ACPI (Advanced Configuration and Power Interface) specification) for various components of device 2500. Merely as an example, PCU 2510 and/or PMIC 2512 may cause various components of the device 2500 to transition to a sleep state, to an active state, to an appropriate C state (e.g., C0 state, or another appropriate C state, in accordance with the ACPI specification), etc. In an example, PCU 2510 and/or PMIC 2512 may control a voltage output by VR 2514 (e.g., SCVR) and/or a frequency of a clock signal output by the clock generator, e.g., by outputting the VID signal and/or the FID signal, respectively. In an example, PCU 2510 and/or PMIC 2512 may control battery power usage, charging of battery 2518, and features related to power saving operation.

The clock generator 2516 can comprise a phase locked loop (PLL), frequency locked loop (FLL), or any suitable clock source. In some embodiments, each core of processor 2504 has its own clock source. As such, each core can operate at a frequency independent of the frequency of operation of the other core. In some embodiments, PCU 2510 and/or PMIC 2512 performs adaptive or dynamic frequency scaling or adjustment. For example, clock frequency of a processor core can be increased if the core is not operating at its maximum power consumption threshold or limit. In some embodiments, PCU 2510 and/or PMIC 2512 determines the operating condition of each core of a processor, and opportunistically adjusts frequency and/or power supply voltage of that core without the core clocking source (e.g., PLL of that core) losing lock when the PCU 2510 and/or PMIC 2512 determines that the core is operating below a target performance level. For example, if a core is drawing current from a power supply rail less than a total current allocated for that core or processor 2504, then PCU 2510 and/or PMIC 2512 can temporality increase the power draw for that core or processor 2504 (e.g., by increasing clock frequency and/or power supply voltage level) so that the core or processor 2504 can perform at higher performance level. As such, voltage and/or frequency can be increased temporality for processor 2504 without violating product reliability.

In an example, PCU 2510 and/or PMIC 2512 may perform power management operations, e.g., based at least in part on receiving measurements from power measurement circuitries 2542, temperature measurement circuitries 2540, charge level of battery 2518, and/or any other appropriate information that may be used for power management. To that end, PMIC 2512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2510 and/or PMIC 2512 in at least one embodiment to allow PCU 2510 and/or PMIC 2512 to manage processor core energy at least in part based on value(s) detected by one or more of the sensors.

Also illustrated is an example software stack of device 2500 (although not all elements of the software stack are illustrated). Merely as an example, processors 2504 may execute application programs 2550, Operating System 2552, one or more Power Management (PM) specific application programs (e.g., generically referred to as PM applications 2558), and/or the like. PM applications 2558 may also be executed by the PCU 2510 and/or PMIC 2512. OS 2552 may also include one or more PM applications 2556a, 2556b, 2556c. The OS 2552 may also include various drivers 2554a, 2554b, 2554c, etc., some of which may be specific for power management purposes. In some embodiments, device 2500 may further comprise a Basic Input/Output System (BIOS) 2520. BIOS 2520 may communicate with OS 2552 (e.g., via one or more drivers 2554), communicate with processors 2504, etc.

For example, one or more of PM applications 2558, 2556, drivers 2554, BIOS 2520, etc. may be used to implement power management specific tasks, e.g., to control voltage and/or frequency of various components of device 2500, to control wake-up state, sleep state, and/or any other appropriate power state of various components of device 2500, control battery power usage, charging of the battery 2518, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Following examples are provided to illustrate the various embodiments. These examples can depend from one another in any suitable manner.

Example 1: An apparatus comprising: a first circuit to generate a first reference current with a first temperature coefficient; a second circuit to generate a second reference current with a second temperature coefficient, wherein the first circuit is coupled to the second circuit via a node such that the second reference current is subtracted from the first reference current at the node; and a current mirror coupled to the node, wherein the current mirror is to provide a third reference current.

Example 2: The apparatus of example 1, wherein the third reference current is proportional to a difference between the second reference current and the first reference current.

Example 3: The apparatus of example 1 comprises a third circuit coupled to the current mirror, wherein the third circuit is to convert the third reference current to a reference voltage.

Example 4: The apparatus of example 1, wherein the first temperature coefficient is positive and the second temperature coefficient is negative.

Example 5: The apparatus of example 1, wherein the first temperature coefficient is positive and the second temperature coefficient is positive such that the first temperature coefficient has a different slope than the second temperature coefficient.

Example 6: The apparatus of example 1, wherein the first temperature coefficient is negative and the second temperature coefficient is positive.

Example 7: The apparatus of example 1, wherein the first temperature coefficient is negative and the second temperature coefficient is negative such that the first temperature coefficient has a different slope than the second temperature coefficient.

Example 8: The apparatus of example 1, wherein the first circuitry comprises first interlock current mirrors to generate the first reference current.

Example 9: The apparatus of claim 1, wherein the second circuitry comprises second interlock current mirrors to generate the second reference current.

Example 10: The apparatus of example 1, wherein the first circuitry comprises a start-up circuitry.

Example 11: The apparatus of example 1, wherein the first reference current is a saturation current while the second reference current is a subthreshold current.

Example 12: An apparatus comprising: a first reference current generator to provide a first reference current with a first temperature coefficient; a second reference current generator to provide a second reference current with a second temperature coefficient; and a current mirror coupled the first and second reference current generators, wherein the current mirror is to provide a third reference current proportional to a difference between the second reference current and the first reference current.

Example 13: The apparatus of example 12, comprises a current-to-voltage generator coupled to the current mirror, wherein the current-to-voltage generator is to convert the third reference current to a reference voltage.

Example 14: The apparatus of example 12, wherein the third reference current has substantially zero temperature coefficient.

Example 15: The apparatus of example 12, wherein the first reference current generator comprises first interlock current mirrors to generate the first reference current.

Example 16: The apparatus of example 12, wherein the second reference current generator comprises second interlock current mirrors to generate the second reference current.

Example 17: A system comprising: a memory; a processor coupled to the memory, wherein the processor includes a reference generator which comprises: a first circuit to generate a first reference current with a first temperature coefficient; a second circuit to generate a second reference current with a second temperature coefficient, wherein the first circuit is coupled to the second circuit via a node such that the second reference current is subtracted from the first reference current at the node; and a current mirror coupled to the node, wherein the current mirror is to provide a third reference current; and a wireless interface to allow the processor to communicate with another device.

Example 18: The system of example 17, wherein the processor comprises a current-to-voltage generator coupled to the current mirror, wherein the current-to-voltage generator is to convert the third reference current to a reference voltage.

Example 19: The system of example 17, wherein the third reference current has substantially zero temperature coefficient.

Example 20: The system of example 17, wherein first circuit comprises first interlock current mirrors to generate the first reference current, and wherein the second circuit comprises second interlock current mirrors to generate the second reference current.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first circuit to generate a first reference current with a first temperature coefficient, wherein the first circuit comprises a first pair of p-type transistors and a first pair of n-type transistors, the first pair of p-type transistors and the first pair of n-type transistors configured as a first interlocked current mirror;
   a second circuit to generate a second reference current with a second temperature coefficient, wherein the first circuit is coupled to the second circuit via a node such that the second reference current is subtracted from the first reference current at the node and wherein the second circuit comprises a second pair of p-type transistors and a second pair of n-type transistors, the second pair of p-type transistors and the second pair of n-type transistors configured as a second interlocked current mirror; and
   a current mirror coupled to the node, wherein the current mirror is to provide a third reference current.

2. The apparatus of claim 1, wherein the third reference current is proportional to a difference between the second reference current and the first reference current.

3. The apparatus of claim 1 comprises a third circuit coupled to the current mirror, wherein the third circuit is to convert the third reference current to a reference voltage.

4. The apparatus of claim 1, wherein the first temperature coefficient is positive and the second temperature coefficient is negative.

5. The apparatus of claim 1, wherein the first temperature coefficient is positive and the second temperature coefficient is positive such that the first temperature coefficient has a different slope than the second temperature coefficient.

6. The apparatus of claim 1, wherein the first temperature coefficient is negative and the second temperature coefficient is positive.

7. The apparatus of claim 1, wherein the first temperature coefficient is negative and the second temperature coefficient is negative such that the first temperature coefficient has a different slope than the second temperature coefficient.

8. The apparatus of claim 1, wherein the first circuitry comprises first interlock current mirrors to generate the first reference current.

9. The apparatus of claim 1, wherein the second circuitry comprises second interlock current mirrors to generate the second reference current.

10. The apparatus of claim 1, wherein the first circuitry comprises a start-up circuitry.

11. The apparatus of claim 1, wherein the first reference current is a saturation current while the second reference current is a subthreshold current.

12. An apparatus comprising:
    a first reference current generator to provide a first reference current with a first temperature coefficient, wherein the first reference current generator comprises a first pair of p-type transistors and a first pair of n-type transistors, the first pair of p-type transistors and the first pair of n-type transistors configured as a first interlocked current mirror;

a second reference current generator to provide a second reference current with a second temperature coefficient, wherein the second reference current generator comprises a second pair of p-type transistors and a second pair of n-type transistors, the second pair of p-type transistors and the second pair of n-type transistors configured as a second interlocked current mirror; and a current mirror coupled the first and second reference current generators, wherein the current mirror is to provide a third reference current proportional to a difference between the second reference current and the first reference current.

13. The apparatus of claim 12, comprises a current-to-voltage generator coupled to the current mirror, wherein the current-to-voltage generator is to convert the third reference current to a reference voltage.

14. The apparatus of claim 12, wherein the third reference current has substantially zero temperature coefficient.

15. The apparatus of claim 12, wherein the first reference current generator comprises first interlock current mirrors to generate the first reference current.

16. The apparatus of claim 12, wherein the second reference current generator comprises second interlock current mirrors to generate the second reference current.

17. A system comprising:
a memory;
a processor coupled to the memory, wherein the processor includes a reference generator which comprises:
a first circuit to generate a first reference current with a first temperature coefficient, wherein the first circuit comprises a first pair of p-type transistors and a first pair of n-type transistors, the first pair of p-type transistors and the first pair of n-type transistors configured as a first interlocked current mirror;

a second circuit to generate a second reference current with a second temperature coefficient, wherein the first circuit is coupled to the second circuit via a node such that the second reference current is subtracted from the first reference current at the node and wherein the second circuit comprises a second pair of p-type transistors and a second pair of n-type transistors, the second pair of p-type transistors and the second pair of n-type transistors configured as a second interlocked current mirror; and a current mirror coupled to the node, wherein the current mirror is to provide a third reference current; and a wireless interface to allow the processor to communicate with another device.

18. The system of claim 17, wherein the processor comprises a current-to-voltage generator coupled to the current mirror, wherein the current-to-voltage generator is to convert the third reference current to a reference voltage.

19. The system of claim 17, wherein the third reference current has substantially zero temperature coefficient.

20. The system of claim 17, wherein first circuit comprises first interlock current mirrors to generate the first reference current, and wherein the second circuit comprises second interlock current mirrors to generate the second reference current.

* * * * *